(12) United States Patent
Chen et al.

(10) Patent No.: US 11,068,560 B2
(45) Date of Patent: **\*Jul. 20, 2021**

(54) METHOD OF PROCESSING VEHICLE DIAGNOSTIC DATA

(71) Applicant: Innova Electronics Corporation, Irvine, CA (US)

(72) Inventors: Ieon C. Chen, Laguna Hills, CA (US); Robert Madison, Eastvale, CA (US); Keith Andreasen, Garden Grove, CA (US)

(73) Assignee: INNOVA ELECTRONICS, INC., Irvine, CA (US)

( * ) Notice: Subject to any disclaimer, the term of this patent is extended or adjusted under 35 U.S.C. 154(b) by 547 days.

This patent is subject to a terminal disclaimer.

(21) Appl. No.: 13/781,477

(22) Filed: Feb. 28, 2013

(65) Prior Publication Data

US 2013/0297143 A1 Nov. 7, 2013
US 2018/0081857 A9 Mar. 22, 2018

Related U.S. Application Data

(63) Continuation of application No. 13/461,368, filed on May 1, 2012, now Pat. No. 9,026,400, which is a (Continued)

(51) Int. Cl.
*G06F 17/00* (2019.01)
*G06Q 10/00* (2012.01)
(Continued)

(52) U.S. Cl.
CPC ............. *G06F 17/00* (2013.01); *G06Q 10/20* (2013.01); *G06Q 50/30* (2013.01); *G07C 5/008* (2013.01); *G07C 5/0808* (2013.01)

(58) Field of Classification Search
CPC ........ G06Q 10/20; G06Q 50/30; G06F 17/00; G07C 5/0808; G07C 5/008
(Continued)

(56) References Cited

U.S. PATENT DOCUMENTS 2,960,654 A 11/1960 Nelson
3,646,438 A 2/1972 Staff
(Continued)

*Primary Examiner* — Eman A Alkafawi
(74) *Attorney, Agent, or Firm* — Stetina Brunda Garred and Brucker; Mark B. Garred

(57) ABSTRACT

A method of processing vehicle diagnostic data is provided for identifying likely vehicle fix(s) associated with a diagnostic data, and identifying a repair procedure(s) for correcting the likely fix(s). The process receiving vehicle diagnostic data from a vehicle onboard computer at a remote diagnostic database, the database being arranged to map vehicle diagnostic data to possible vehicle fix(s). The possible vehicle fix(s) are prioritized in accordance with ranked matches of the received diagnostic data to combinations of diagnostic data stored in a prior experience database. The prior experience database having an identified fix associated with each stored combination of diagnostic data. The fix associated with the highest ranked combination of diagnostic data is identified as the most likely fix. The most likely fix is mapped to a vehicle repair database, the most likely fix being directly mapped to an associated repair procedure for repairing the most likely fix.

32 Claims, 4 Drawing Sheets

Related U.S. Application Data continuation-in-part of application No. 12/715,181, filed on Mar. 1, 2010, now Pat. No. 8,370,018, which is a continuation-in-part of application No. 11/823,757, filed on Jun. 28, 2007, now Pat. No. 8,019,503.

(51) Int. Cl.
  *G07C 5/00* (2006.01)
  *G07C 5/08* (2006.01)
  *G06Q 50/30* (2012.01)

(58) Field of Classification Search
  USPC .................................................. 702/182–184
  See application file for complete search history.

(56) References Cited

U.S. PATENT DOCUMENTS

| | | |
|---|---|---|
| 4,112,748 A | 9/1978 | Walley |
| 4,176,315 A | 11/1979 | Sunnarborg |
| 4,207,611 A | 6/1980 | Gordon |
| 4,404,639 A | 9/1983 | McGuire et al. |
| 4,684,896 A | 8/1987 | Weishaupt |
| 4,689,573 A | 8/1987 | Hilmer |
| 4,859,932 A | 8/1989 | Whitley |
| 4,884,033 A | 11/1989 | McConchie, Sr. |
| 5,003,478 A | 3/1991 | Kobayashi et al. |
| 5,005,129 A | 4/1991 | Abe et al. |
| 5,032,791 A | 7/1991 | Bates |
| 5,107,428 A | 4/1992 | Bethencourt et al. |
| 5,157,708 A | 10/1992 | Garthwaite et al. |
| 5,170,125 A | 12/1992 | Bates |
| D334,560 S | 4/1993 | Wilson |
| 5,214,582 A | 5/1993 | Gray |
| 5,247,245 A | 9/1993 | Nelson |
| 5,278,508 A | 1/1994 | Bowman |
| 5,285,163 A | 2/1994 | Liotta |
| 5,347,211 A | 9/1994 | Jakubowski |
| 5,359,290 A | 10/1994 | Cervas |
| 5,394,093 A | 2/1995 | Cervas |
| 5,400,018 A | 3/1995 | Scholl et al. |
| 5,481,906 A | 1/1996 | Nagayoshi et al. |
| 5,491,418 A | 2/1996 | Alfaro et al. |
| 5,506,772 A | 4/1996 | Kubozono et al. |
| 5,519,397 A | 5/1996 | Chapotot et al. |
| 5,532,927 A | 7/1996 | Pink et al. |
| 5,541,840 A | 7/1996 | Gurne et al. |
| D377,622 S | 1/1997 | Chen et al. |
| 5,631,831 A | 5/1997 | Bird et al. |
| 5,635,841 A | 6/1997 | Taylor |
| 5,657,233 A | 8/1997 | Cherrington et al. |
| 5,758,300 A | 5/1998 | Abe |
| 5,767,681 A | 6/1998 | Huang |
| 5,875,413 A | 2/1999 | Vinci |
| 5,916,286 A | 6/1999 | Seashore et al. |
| 5,935,180 A | 8/1999 | Fieramosca et al. |
| 6,000,413 A | 12/1999 | Chen |
| 6,021,366 A | 2/2000 | Fieramosca et al. |
| 6,061,638 A | 5/2000 | Joyce |
| 6,097,998 A | 8/2000 | Lancki |
| 6,141,608 A * | 10/2000 | Rother ............... G01M 17/007 |
| | | 701/29.1 |
| 6,225,898 B1 | 5/2001 | Kamiya et al. |
| 6,263,265 B1 | 7/2001 | Fera |
| 6,263,268 B1 | 7/2001 | Nathanson |
| 6,263,322 B1 | 7/2001 | Kirkevold et al. |
| 6,295,492 B1 | 9/2001 | Lang et al. |
| 6,314,422 B1 | 11/2001 | Barker et al. |
| 6,330,499 B1 | 12/2001 | Chou et al. |
| 6,359,422 B1 | 3/2002 | Lewis |
| 6,359,442 B1 | 3/2002 | Henningson et al. |
| 6,370,454 B1 | 4/2002 | Moore |
| 6,389,337 B1 | 5/2002 | Kolls |
| 6,434,455 B1 | 8/2002 | Snow et al. |
| 6,459,969 B1 | 10/2002 | Bates et al. |
| 6,473,659 B1 | 10/2002 | Shah et al. |
| 6,499,385 B2 | 12/2002 | Protti |
| 6,535,802 B1 | 3/2003 | Kramer |
| 6,594,579 B1 | 7/2003 | Lowrey et al. |
| 6,604,033 B1 | 8/2003 | Banet et al. |
| 6,611,740 B2 | 8/2003 | Lowrey et al. |
| 6,636,790 B1 | 10/2003 | Lightner et al. |
| 6,680,675 B1 | 1/2004 | Suzuki |
| 6,687,584 B2 | 2/2004 | Andreasen et al. |
| 6,701,233 B2 | 3/2004 | Namaky et al. |
| 6,718,425 B1 | 4/2004 | Pajakowski et al. |
| 6,738,696 B2 | 5/2004 | Oi |
| 6,771,073 B2 | 8/2004 | Henningson et al. |
| 6,823,243 B2 | 11/2004 | Chinnadurai et al. |
| 6,832,141 B2 | 12/2004 | Skeen et al. |
| 6,868,369 B2 | 3/2005 | Huang et al. |
| 6,940,270 B2 | 9/2005 | Chen |
| 6,941,203 B2 | 9/2005 | Chen |
| D510,287 S | 10/2005 | Chen et al. |
| 6,957,133 B1 | 10/2005 | Hunt et al. |
| 6,968,733 B2 | 11/2005 | Andreasen et al. |
| 7,012,512 B2 | 3/2006 | St. Denis |
| 7,030,742 B2 | 4/2006 | Treadway |
| 7,073,714 B2 | 7/2006 | Namaky et al. |
| 7,085,680 B2 | 8/2006 | Huang |
| 7,116,216 B2 | 10/2006 | Andreasen et al. |
| 7,209,813 B2 | 4/2007 | Namaky |
| RE39,619 E | 5/2007 | Andreasen |
| D545,223 S | 6/2007 | Chen |
| D558,621 S | 1/2008 | Rich et al. |
| D559,137 S | 1/2008 | Protti |
| D560,129 S | 1/2008 | Rich et al. |
| D560,527 S | 1/2008 | Rich et al. |
| 7,325,775 B2 | 2/2008 | Chen |
| D563,249 S | 3/2008 | Chen |
| D569,280 S | 5/2008 | Chen |
| 7,376,497 B2 | 5/2008 | Chen |
| D571,241 S | 6/2008 | Andreasen et al. |
| 7,437,227 B2 | 10/2008 | Andreasen et al. |
| D581,822 S | 12/2008 | Madison et al. |
| 7,464,000 B2 | 12/2008 | Huang |
| 7,477,968 B1 * | 1/2009 | Lowrey ................. G01M 15/04 |
| | | 340/438 |
| D588,621 S | 3/2009 | Baty |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,590,476 B2 | 9/2009 | Shumate |
| 7,603,293 B2 | 10/2009 | Chenn |
| D610,586 S | 2/2010 | Chen |
| 7,684,908 B1 | 3/2010 | Ogilvie et al. |
| 7,734,390 B2 | 6/2010 | Chen |
| D624,446 S | 9/2010 | Chen et al. |
| D624,838 S | 10/2010 | Chen et al. |
| D625,209 S | 10/2010 | Chen et al. |
| D625,210 S | 10/2010 | Chen et al. |
| D625,634 S | 10/2010 | Chen et al. |
| 7,974,750 B2 | 7/2011 | Namaky |
| 8,019,503 B2 | 9/2011 | Andreasen et al. |
| 8,024,083 B2 | 9/2011 | Chenn |
| D646,188 S | 10/2011 | Chen et al. |
| D646,599 S | 10/2011 | Chen et al. |
| 8,032,419 B2 | 10/2011 | Chen |
| 8,068,951 B2 | 11/2011 | Chen et al. |
| 8,301,329 B2 | 10/2012 | Andreasen |
| 8,306,687 B2 | 11/2012 | Chen |
| 8,370,018 B2 | 2/2013 | Andreasen et al. |
| 8,600,610 B2 | 12/2013 | Bertosa et al. |
| 8,649,047 B2 * | 2/2014 | Martin .................. G03G 15/55 |
| | | 358/1.15 |
| 8,811,008 B2 | 8/2014 | Selkirk et al. |
| 9,183,681 B2 | 11/2015 | Fish |
| D745,029 S | 12/2015 | Gray et al. |
| D746,316 S | 12/2015 | Gray et al. |
| D746,323 S | 12/2015 | Gray et al. |
| 9,213,332 B2 | 12/2015 | Fish et al. |
| D747,734 S | 1/2016 | Gray et al. |
| D749,623 S | 2/2016 | Gray et al. |
| 9,262,254 B2 | 2/2016 | Bertosa et al. |

(56) References Cited

U.S. PATENT DOCUMENTS

| | | |
|---|---|---|
| 9,292,977 B2 | 3/2016 | Bertosa et al. |
| D757,059 S | 5/2016 | Gray et al. |
| 9,329,633 B2 | 5/2016 | Selkirk et al. |
| D770,462 S | 11/2016 | Gray et al. |
| 9,858,731 B2 | 1/2018 | Fish et al. |
| 9,904,634 B2 | 2/2018 | Case, Jr. et al. |
| 10,295,333 B2 | 5/2019 | Fish et al. |
| 10,467,906 B2 | 11/2019 | Fish et al. |
| 2001/0053983 A1 | 12/2001 | Reichwein et al. |
| 2002/0007237 A1 | 1/2002 | Phung et al. |
| 2002/0016655 A1 | 2/2002 | Joao |
| 2002/0156692 A1 | 10/2002 | Squeglia et al. |
| 2002/0193925 A1 | 12/2002 | Funkhouser et al. |
| 2003/0060953 A1 | 3/2003 | Chen |
| 2003/0171111 A1 | 9/2003 | Clark |
| 2003/0177417 A1 | 9/2003 | Malhotra et al. |
| 2004/0044454 A1 | 3/2004 | Ross et al. |
| 2004/0172177 A1 | 9/2004 | Nagai et al. |
| 2004/0227523 A1 | 11/2004 | Namaky |
| 2005/0021294 A1 | 1/2005 | Trsar et al. |
| 2005/0060070 A1 | 3/2005 | Kapolka et al. |
| 2005/0143882 A1 | 6/2005 | Umezawa |
| 2005/0203683 A1 | 9/2005 | Olsen et al. |
| 2006/0027650 A1* | 2/2006 | Andreasen ........... G07C 5/0808 235/384 |
| 2006/0041348 A1 | 2/2006 | Liebl et al. |
| 2006/0041349 A1 | 2/2006 | Chinnadurai et al. |
| 2006/0095230 A1* | 5/2006 | Grier ................. G05B 23/0216 702/183 |
| 2006/0161313 A1 | 7/2006 | Rogers et al. |
| 2007/0005201 A1* | 1/2007 | Chenn ................... G07C 5/008 701/31.5 |
| 2007/0083306 A1* | 4/2007 | Comeau ............... G07C 5/008 701/29.6 |
| 2008/0004764 A1 | 1/2008 | Chinnadurai et al. |
| 2008/0119981 A1 | 5/2008 | Chen |
| 2009/0006476 A1 | 1/2009 | Andreasen et al. |
| 2009/0276115 A1 | 11/2009 | Chen |
| 2009/0326757 A1 | 12/2009 | Andreasen et al. |
| 2010/0174446 A1* | 7/2010 | Andreasen ............ G07C 5/008 701/31.4 |
| 2011/0112932 A1 | 5/2011 | Chen |
| 2011/0224866 A1 | 9/2011 | Chen |
| 2011/0264322 A1 | 10/2011 | Chen |
| 2012/0010775 A1 | 1/2012 | Chen |
| 2012/0215398 A1 | 8/2012 | Chen |
| 2017/0186054 A1 | 6/2017 | Fish et al. |
| 2018/0101775 A1 | 4/2018 | Fish |

* cited by examiner

METHOD OF PROCESSING VEHICLE DIAGNOSTIC DATA

CROSS-REFERENCE TO RELATED APPLICATIONS

This application is a continuation of and incorporates the substance of application Ser. No. 13/461,368 filed on May 1, 2012, which is a continuation-in-part of and incorporates the substance of application Ser. No. 12/715,181 filed on Mar. 1, 2010, now issued as U.S. Pat. No. 8,370,018 on Feb. 5, 2013, which is a continuation-in-part of and incorporates the substance of application Ser. No. 11/823,757 filed on Jun. 28, 2007, now issued as U.S. Pat. No. 8,019,503 on Sep. 13, 2011.

STATEMENT RE: FEDERALLY SPONSORED RESEARCH/DEVELOPMENT

Not Applicable

BACKGROUND

The present invention relates to vehicle diagnostic and repair services and, more particularly, to an on-line system for integrating the analysis of vehicle diagnostic information, identifying a likely diagnosis from such information.

For many years, automotive vehicles have included diagnostic systems that are electronic control modules and diagnostic systems for monitoring the status of associated automotive equipment. Over time, the diagnostic systems have become more sophisticated, and the information conveyed by the diagnostic systems have become more standardized, assisting in the evaluation of vehicle conditions and identifying appropriate repair procedures.

Contemporary automotive control systems include electronic control modules (ECM's) that generate signals representative of the status of various monitors and other automotive devices, as well as providing real-time data concerning the operation of those devices. When a system operates outside of defined limits, the ECM typically generates diagnostic data or information, such as diagnostic trouble codes, PIDs or other signals (collectively referred to as diagnostic trouble codes or DTCs). The DTCs are typically stored in the ECM memory, accessible using tools such as code readers or scan tools. Such contemporary tools include the Innova Model 3110 Scan Tool and the Innova Model 3100 Code Reader.

In some cases, the scan tool or code reader will simply identify the alphanumeric DTC, and the user may refer to an accompanying manual, or on-line resource, to identify an associated descriptor. In other cases the scan tool code reader may also display the descriptor associated with the DTC and other information.

However, an indication from a scan tool or code reader that a particular system or device is operating outside of defined limits does not necessarily identify the nature of the underlying problem. In some cases DTCs referring to one automotive system may be symptomatic of a problem, or problems arising in a completely different system. The presence of one or more DTCs may, therefore, be indicative of a number of different possible problems, and not necessarily associated with a readily identified cause.

Over time, experienced mechanics learn to correlate certain DTCs, or combinations of DTCs, with specific underlying problems that need to be remedied. However, with so many different vehicles to be repaired, and different hardware/software configurations within different vehicles, the process of diagnosing a vehicle condition from DTCs and other diagnostic information may be challenging, requiring extensive analysis of the mechanical, electrical, and software systems of the particular vehicle being serviced. This obviously may be a cumbersome process that requires considerable effort and expense.

In order to facilitate the analysis of vehicle diagnostic information, various bulletin boards and other websites have been established where mechanics may post information identifying the vehicle and associated diagnostic information. Other mechanics may then reply, indicating if they have encountered similar circumstances and, if so, what was found to be the underlying vehicle problem. Over time that information gathered at technical support centers responding to diagnostic conditions can be collected and made available to subscribing mechanics.

Conventionally, the mechanic would then have access to one or more possible solutions, i.e., repairs for the vehicle condition(s) that generated the diagnostic information. The mechanic would still need to identify the most likely condition and then identify the appropriate solution to repair that vehicle condition(s). Such repair procedures may be identified by reference to appropriate vehicle manuals, or sources such as Chilton's™ Automotive Repairs, a well-known source for vehicle repair procedures, which may also be found on-line. Once the mechanic obtains access to the website, e.g., by purchasing a subscription, the mechanic may page or scroll through the on-line manual(s) to locate specific repair procedure, and then commence that repair. However, accessing a repair procedure website and locating an identified repair introduces further delays and uncertainties in the process, and may require expensive subscriptions that are infrequently utilized. Consequently, while on-line information respecting automotive diagnostics and repair procedures is available to mechanic, the conventional process for accessing and evaluating possible diagnostic solutions, and accessing the specific procedure necessary to repair the identified solution, may be uncertain, cumbersome, expensive and introduce undue delay, as the mechanic goes from one resource to another in an effort to identify and repair the vehicle condition.

The present invention is directed to a system and technique for integrating informational resources available to the mechanic, so that the mechanic may be readily provided with information identifying both the like vehicle condition that gives rise to the diagnostic information, and the procedure(s) useful to remedy that condition, without the need to separately access and scroll through multiple websites or reference sources related to identifying and remedying the underlying vehicle condition.

BRIEF SUMMARY

A method of processing vehicle diagnostic data is provided for identifying likely vehicle fix(s) associated with a diagnostic data, and identifying a repair procedure(s) for correcting the likely fix(s). The process receiving vehicle diagnostic data from a vehicle onboard computer at a remote diagnostic database, the database being arranged to map vehicle diagnostic data to possible vehicle fix(s). The possible vehicle fix(s) are prioritized in accordance with ranked matches of the received diagnostic data to combinations of diagnostic data stored in a prior experience database. The prior experience database having an identified fix associated with each stored combination of diagnostic data. The fix associated with the highest ranked combination of diagnostic data is identified as the most likely fix. The most likely fix is mapped to a vehicle repair database, the most likely fix being directly mapped to an associated repair procedure for repairing the most likely fix.

In one embodiment the step of prioritizing possible vehicle fix(s) comprises comparing combinations of diagnostic trouble codes received from the vehicle onboard computer to stored combinations of diagnostic trouble codes in the prior experience database. The stored combination of diagnostic trouble codes ranked highest in relation to the diagnostic trouble codes received from the vehicle onboard computer is thereby identified. The fix associated with the highest ranked stored combination of diagnostic trouble codes e.g., the highest priority vehicle experience data, is identified as the most likely fix.

The step of prioritizing possible vehicle fix(s) may be implemented based on prioritization rules such as identifying the stored combination of digital trouble codes which include each of the diagnostic trouble codes received from the vehicle onboard computer, with a minimum of additional diagnostic trouble codes.

Prioritization steps may also include identifying stored combinations of digital trouble codes, and associated fix(s), having the highest successful fix count. Additional prioritization rules may include prioritization of stored combinations of diagnostic trouble codes in accordance with the cost of repair of the associated fix.

In one embodiment, the method further includes accessing an automotive repair procedures database for repairing a range of automotive conditions, linking the most likely fix to a selected repair procedure(s) in the repair procedures database, the selected repair procedure(s) being effective to repair the most likely fix. The selected repair procedure is then accessed.

The vehicle diagnostic data and vehicle identification information may be wirelessly uploaded from a hand held scan to a personal computer, cell phone or wireless onboard communication device adapted to access the remote diagnostic database via the World Wide Web.

In one embodiment the communication path between the scan tool or onboard communication device is implemented via a blue tooth local communication network or the equivalent.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The description below is given by way of example, and not limitation. Given the disclosure set forth herein, one skilled in the art could devise variations that are within the scope and spirit of the disclosed invention. Further, it is to be understood that the various features of the embodiments disclosed herein can be used alone, or in varying combinations with each other and are not intended to be limited to the specific combination described herein. Thus, the scope of the claims is not to be limited by the illustrated embodiments.

Figure 1:
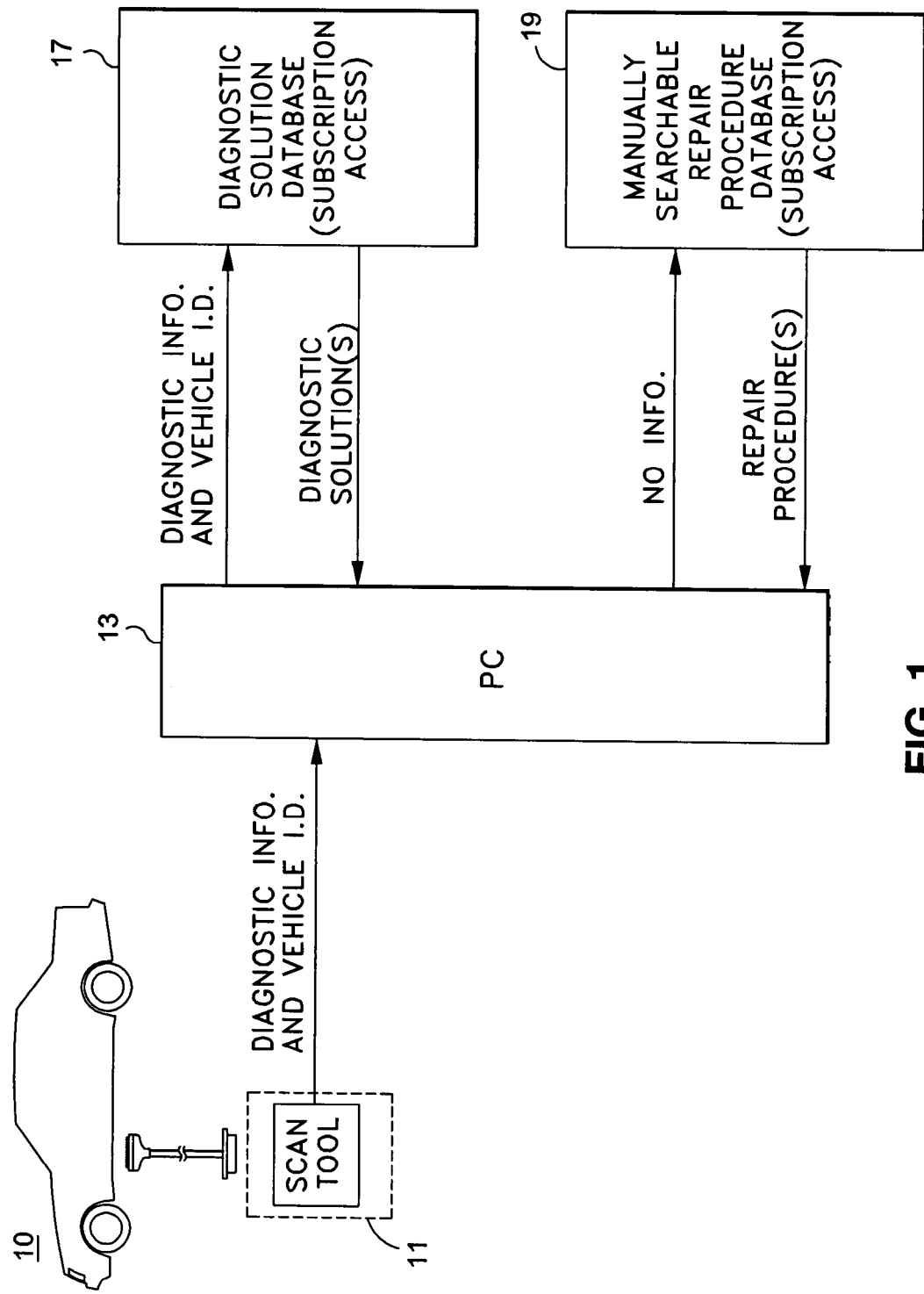
FIG. 1 is a block diagram illustrating the operation of prior art diagnostic procedures.

FIG. 1 illustrates a prior art technique for evaluating vehicle diagnostic information, and for identifying potential repair procedures. In accordance with such techniques, a hand held device such as a hand held scan tool or code reader 11 is engaged to a diagnostic port on vehicle 10 to receive vehicle diagnostic information, such as DTC's status information, etc. Depending upon the particular vehicle, the diagnostic information may be accompanied by vehicle identification information, such as the year/make/model of the vehicle. That information is communicated to a device, such as personal computer 13, where it can be displayed and further processed.

Diagnostic solution database 17 may be separate from the personal computer, PC 13, or may reside within PC 13. Where the diagnostic solution database 17 is separate, it may be remotely connected to PC 13, via the World Wide Web or other communication means. Access to the diagnostic solution database 17 may be freely available to all users, or may be restricted in use, e.g., accessible on a paid subscription basis, or limited to compatibility only with specific scan tools.

In response to receipt of diagnostic information from PC 13, the diagnostic solution database provides information directly associated with the diagnostic trouble code or other information. That information would typically include information describing the substance of the diagnostic information that conforms to a specific DTC, e.g., a DTC descriptor. In some cases, database 17 would also provide some information regarding a possible diagnostic solution, or fix, directly associated with each diagnostic trouble code. Such fixes or diagnostic solutions are communicated to PC 13 where they can be viewed by a user.

A repair procedure for implementing each fix identified by database 17 may be identified by searching repair procedure database 19. Database 19 may be a freely accessible database, or a database restricted to subscription access. In practice, a user accesses the repair procedure database 19, typically through a main page and index, which is used to search for the appropriate procedure(s) associated with repairing each fix identified by database 17. The user would therefore look at the identified fix, and then locate the repair procedure associated with that fix. Where multiple DTC's are identified in the diagnostic information from vehicle 10, the process may be laborious back and forth between looking at possible fixes identified by the diagnostic solution database 17, and accessing associated repair procedures in repair procedure database 19. Diagnostic solution database 17 is not typically operative to evaluate fixes associated with multiple digital trouble codes, or to prioritize possible fixes that could arise in relation to various combinations of digital trouble codes. Moreover, the fixes identified by database 17 may be addressing only the symptoms associated with the DTC's, rather than the underlying cause. In such cases, endeavoring to implement repair procedures associated with each individual DTC may be little more than an exercise in futility as the DTC may return in short order after the repair is complete.

Figure 2:
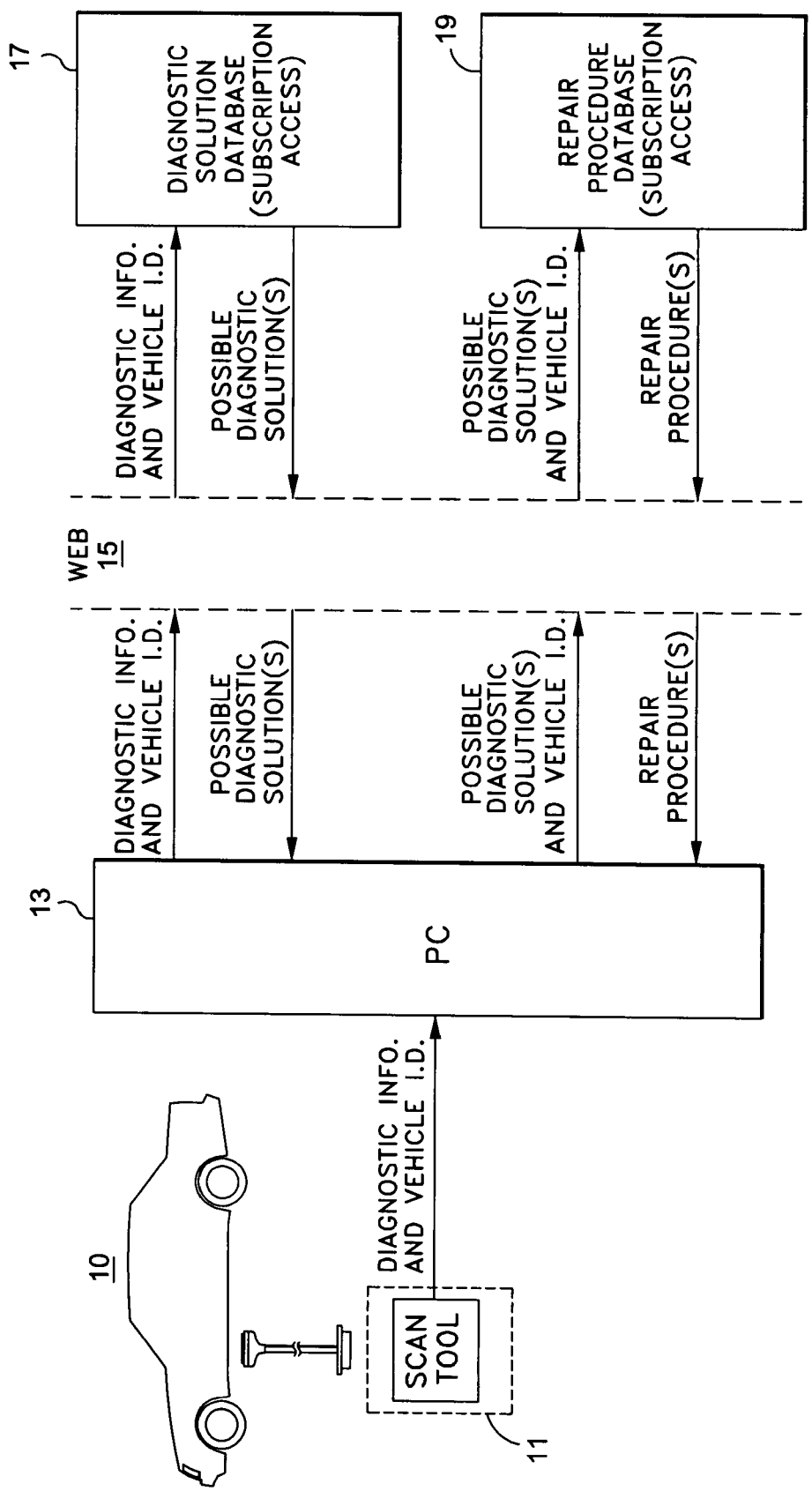
FIG. 2 is another block diagram illustrating the operation of prior art diagnostic procedures.

FIG. 2 illustrates an alternate prior art configuration wherein the diagnostic subscription database 17 and the repair procedure database 19 are accessible to PC 13 via the World Wide Web 15. Again, vehicle diagnostic information is communicated through diagnostic subscription database 17 and possible diagnostic fixes, or solutions, may be individually derived for each DTC and communicated to PC 13.

Each possible diagnostic solution may be communicated to the repair procedure database 19, where it could be separately mapped to a repair procedure. In practice, the diagnostic solution and accompanying vehicle identification information could be parsed or otherwise mapped to access a repair procedure within database 19 that is appropriate to the particular diagnostic trouble code, or associated fix. The identified repair procedure can then be communicated to the user at PC 13.

As with the procedure described in relation to FIG. 1, the procedure described in relation to FIG. 2 does not provide for fixes or diagnostic solutions associated with various combinations of DTC's or other diagnostic information, but does allow direct linking from the DTC's to the associated repair procedure. As such, the diagnostic solutions are most useful in accessing repair procedures associated with clear and unambiguous diagnostic information. The procedure is, therefore, of limited value in relation to more ambiguous diagnostic information, i.e., DTC's that could arise in relation to more than one diagnostic condition, and could be repaired by more than one repair procedure. The procedure may, therefore, be of marginal use to users having little automotive repair background, who typically need a clear indication of the fix to be repaired. Users having a more significant automotive repair background may find information from the databases useful as a resource, but may find the process inefficient and unreliable in relation to defects associated with combinations of DTC's.

Figure 3:
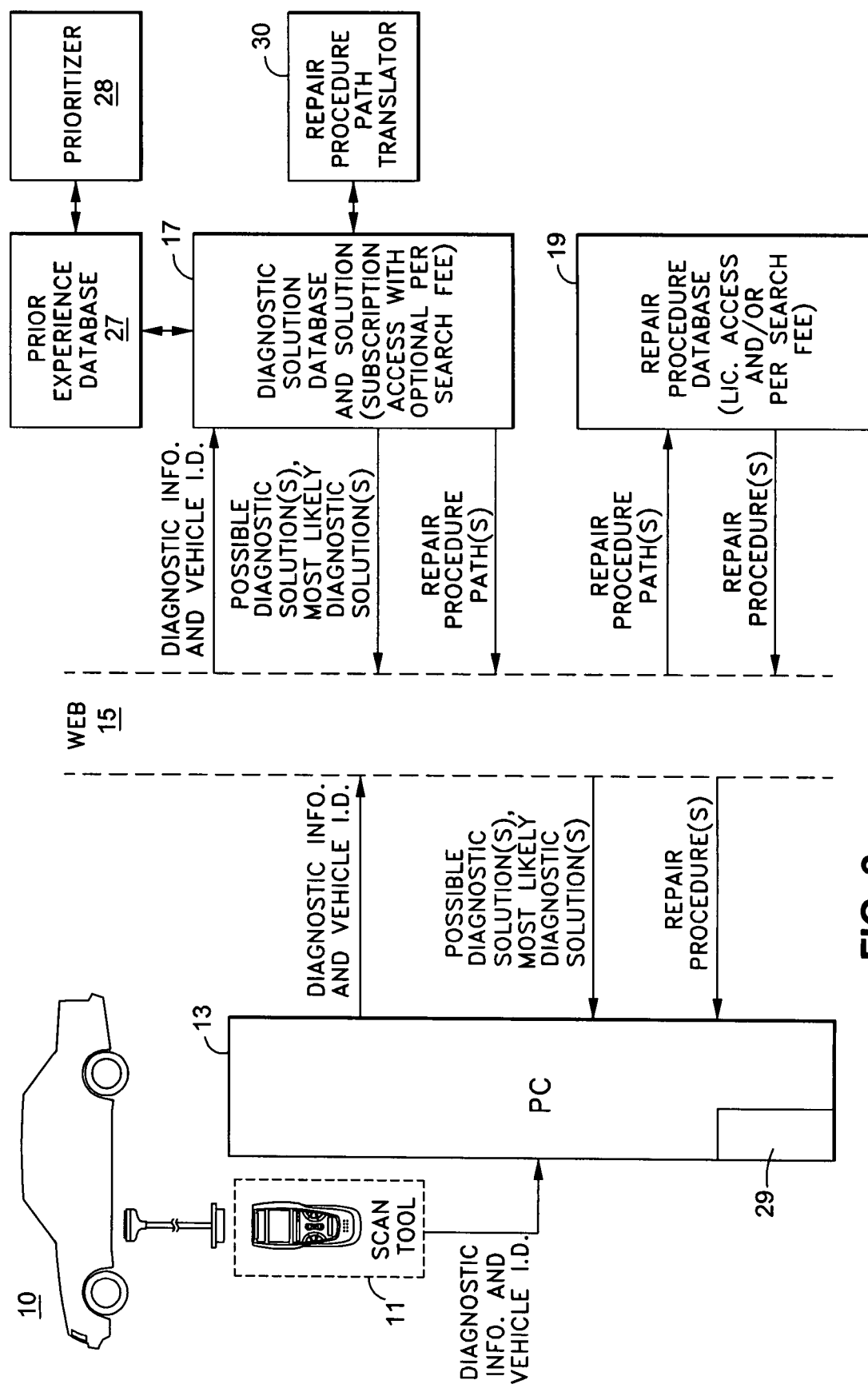
FIG. 3 illustrates one embodiment of the vehicle diagnostic process and system, in accordance with the present invention.

FIG. 3 illustrates a process and configuration in accordance with one aspect of the present invention. As discussed in relation to the preceding figures, diagnostic information from vehicle 10 may be uploaded to scan tool or code reader 11, to be communicated to PC 13, which may be implemented as a personal computer that functions independent of the vehicle 10, or a vehicle onboard communication device adapted to wirelessly access the diagnostic database 17 via the World Wide Web. Such communication from the scan tool 11 may be facilitated by direct wire connection of the scan tool 11 to the PC 13, or by wireless connection from vehicle 10 or scan tool 11 to PC 13. In one embodiment a wireless connection path is formed from the scan tool 11 to the World Wide Web, via cell phone, is described in U.S. patent application Ser. No. 11/172,293 for Cell Phone Based Vehicle Diagnostic System, and issued as U.S. Pat. No. 8,02431, assigned to the common assignee, the contents of which are incorporated herein. In another embodiment the scan tool 11 or onboard computer may communicate diagnostic information to an onboard communication device adapted to access the World Wide Web via a user interface integrated into an automotive display screen. The diagnostic information, which may also include vehicle identifying information, may in turn be communicated to a remote diagnostic solution database 21 via the World Wide Web 15. The diagnostic solution database 21 can operate to translate DTC's to descriptors, and can also define a repair path to a particular location in repair procedure database 19, wherein an associated repair procedure is described.

Where the diagnostic information includes combinations of digital trouble codes and/or other diagnostic data, a prior experience database, such as prior experience database 27, can be accessed to identify similar stored combinations of diagnostic trouble codes, along with associated information, such as the fix(s) associated with such combination of DTC's, the successful diagnosis count associated with each such fix and the cost associated with each such fix. As explained more fully below, the information from the prior experience database is prioritized by the fix prioritizer 20 in accordance with prioritization rules described below. In general, the fix prioritization rules evaluate facts such as whether the stored combinations of DTC's include the same DTC's received from the vehicle 10; whether the stored combinations of DTC's include additional DTC's, other than DTC's from the vehicle 10; the successful diagnosis or fix rate associated with each stored combination of DTC's and the associated fix. Evaluation of such factors, in accordance with the scenarios set forth below, allows the identification of a most likely fix associated with the received DTC's and vehicle identification. As will be apparent to one skilled in the art, the prioritization process described herein is non-iterative, i.e., it proceeds to derive a most likely fix based on consideration of a single set of diagnostic data from the vehicle, which is analyzed in relation to stored diagnostic data from similar vehicles.

In the embodiment illustrated at FIG. 3, the diagnostic solution database 21 is connected to repair procedure path translator 30 wherein the most likely fix, as determined by prioritizer 28, is parsed or otherwise mapped to a specific portion of repair procedure database 19 which defines the procedure for implementing repair of the most likely fix. The repair procedure path is communicated to repair procedure database 19, via the World Wide Web 15, to allow a user to access the repair procedure(s) found to be most appropriate to correct the defects associated with the diagnostic information output from vehicle 10. Information identifying the particular vehicle may also be communicated to the repair procedure database 19 to facilitate mapping at the database 19, or may already be factored into the repair procedure path identified by repair procedure path translator 30.

Figure 4:
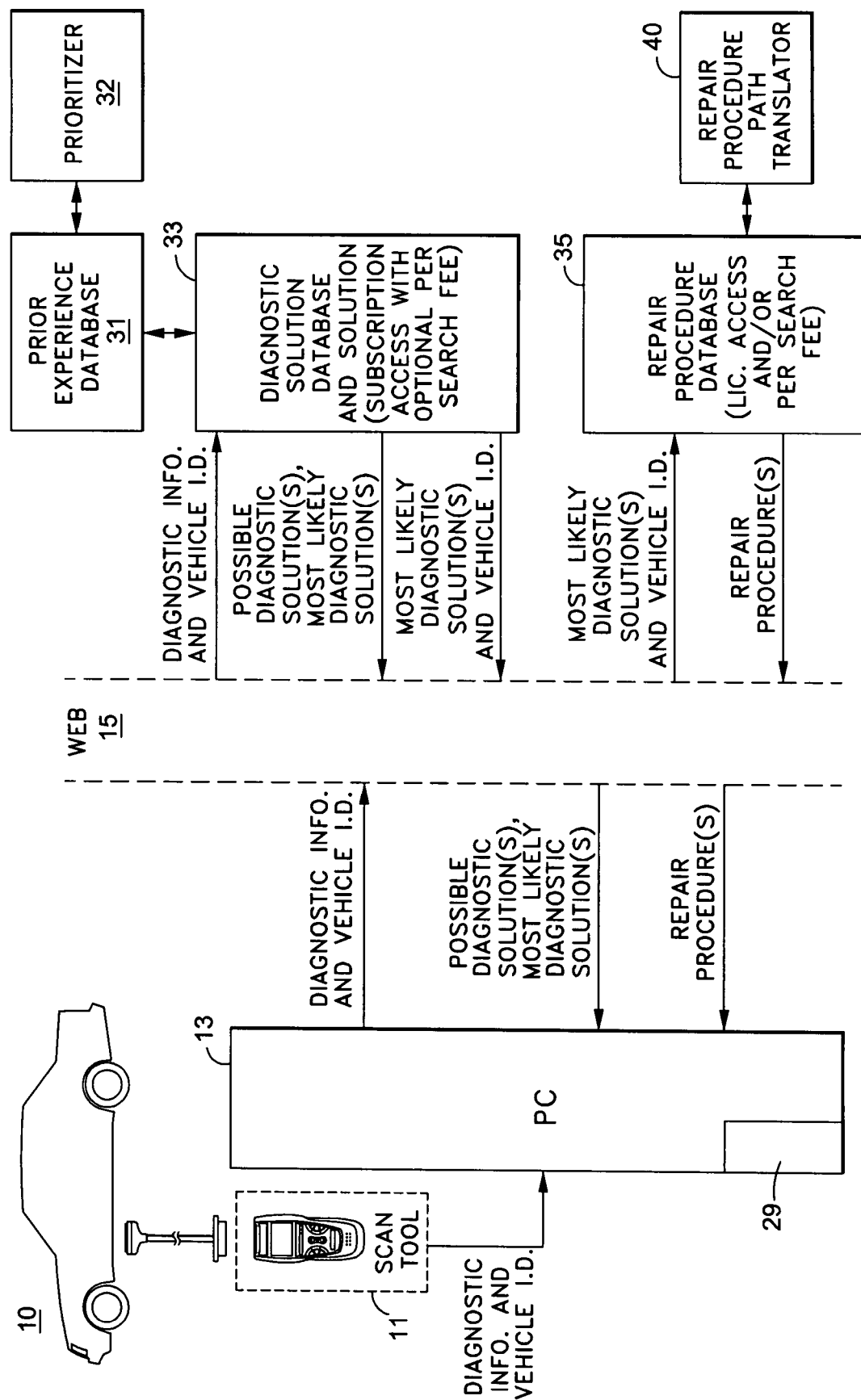
FIG. 4 illustrates a second embodiment of the vehicle diagnostic process and system, in accordance with the present invention.

FIG. 4 illustrates an alternate implementation of the present invention. The primary distinction in relation to the implementation shown in FIG. 4 concerns the location wherein the repair procedure path is defined. In the embodiment of FIG. 4, the prioritizer 32, in cooperation with prior experience database 31, outputs the most likely fix, which is not mapped to a repair procedure path at database 35. Instead, repair procedure path translator 40 operates to map the most likely diagnostic fix(s) to a repair procedure path within repair procedure database 35. In such a way, definition of the appropriate repair procedure path may be affected by administrators of the repair procedure database, who are likely to have greater hands on knowledge of the repair procedure database, and its periodic updates. In practice, information communicated from the diagnostic solution database 33 to the repair procedure database 35 may, therefore, include vehicle identifying information, to facilitate mapping to the appropriate repair procedure in database 35.

Commercial operation of the present invention may incorporate various types of business features, allowing use of the present invention by multiple types of users, on differing terms. In one such implementation PC 13 may be implemented as a kiosk allowing users to input information from a scan tool into the kiosk, whereupon it is communicated to the databases and operated on as described above. The kiosk may additionally incorporate an e-commerce terminal for effecting payment for different features. Those features may include loaning a compatible scan tool for use in accessing diagnostic information from the vehicle 10 and communicating that information to compatible input ports in the kiosk. The e-commerce portal 29 may also facilitate access to the diagnostic solution database 21, either on a subscription basis or on a per search fee. A user, operating via a kiosk, a home personal computer, or some other communication mechanism, and therefore pay a fee to obtain information from the diagnostic solution database, e.g., possible fix and/or or the most likely fix(s). For an additional fee a user may further obtain access, on a per use basis, to the repair procedure(s) associated with the possible fix and/or the most likely fix(s).

Set forth below are tables representing scenarios 1-11 illustrating the manner in which possible diagnostic solutions, or fixes, are prioritized in accordance with one embodiment of the present invention. As described below, the present invention operates to prioritizing, or ranking, fixes in accordance with multiple factors. Those factors may include correspondence to the specific stored DTC's, the absence of additional, non-conforming DTC's, the successful fix count associated with each potential fix, and the cost associated with each fix. The weight given to those factors is described below in relation to the various scenarios.

Scenario 1 illustrates a simple scenario wherein a single primary code, and no secondary code output from the vehicle onboard computer, and the experience database identifies only one fix associated with that DTC. That fix, i.e., Fix 1, is therefore identified as the most likely fix to repair the vehicle condition associated with the identified DTC. Thus, it is apparent that the identification of the highest priority fix may proceed without consideration of any information or data from the vehicle other than the received vehicle identifying information and the accompanying vehicle diagnostic data.

| Scenario 1 | | | | | |
|---|---|---|---|---|---|
| | Fix 1 | Fix 2 | Fix 3 | Fix 4 | Fix 5 |
| P.C. | P0101 | P0101 | | | |
| S.C.(s) | | | | | |
| Count: | | | | | |
| Fix Probability: | 1 | | | | |

Scenario 2 differs in that experience database identifies three different fixes associated with the same DTC. However, each fix has a different successful fix count associated therewith. Under such circumstances the fix having the highest success count is identified as the most likely fix, i.e., Fix 1.

| Scenario 2 | | | | | |
|---|---|---|---|---|---|
| | Fix 1 | Fix 2 | Fix 3 | Fix 4 | Fix 5 |
| P.C. | P0101 | P0101 | P0101 | P0101 | |
| S.C.(s) | | | | | |
| Count: | | 100 | 1 | 30 | |
| Fix Probability: | 1 | 3 | 2 | | |

Scenario 3 illustrates a condition wherein two DTC's are identified and three fixes are associated with the same two DTC's. A fourth fix is identified with one of the two DTC's, and has a higher successful fix count. Under this situation the most likely fix is identified as the fix having the highest success count of the two fixes conforming to both DTC's, i.e., Fix 2.

| Scenario 3 | | | | | |
|---|---|---|---|---|---|
| | Fix 1 | Fix 2 | Fix 3 | Fix 4 | Fix 5 |
| P.C. | P0101 | P0101 | P0101 | P0101 | P0101 |
| S.C.(s) | P0102 | P0102 | P0102 | P0102 | |
| Count: | | 3 | 20 | 10 | 100 |
| Fix Probability: | | 3 | 1 | 2 | 4 |

Scenario 4 presents a situation where no fix is identified which conforms to all four DTC's output from the vehicle onboard computer. Two possible fixes each conform to the same number of DTC's, though one has a higher successful fix count. Under those circumstances, the most likely fix is identified as the fix having the highest count, i.e., Fix 2.

| Scenario 4 | | | | | |
|---|---|---|---|---|---|
| | Fix 1 | Fix 2 | Fix 3 | Fix 4 | Fix 5 |
| P.C. | P0101 | P0101 | P0101 | | |
| S.C.(s) | P0102 | P0102 | P0102 | | |
| | P0103 | | | | |
| | P0104 | | | | |
| Count: | | 3 | 20 | | |
| Fix Probability: | | 2 | 1 | | |

Scenario 5 presents a situation where again no fix conforms to each of the DTC's output from the vehicle onboard computer. The fix conforming to the greatest number of conforming DTC's is selected as the most likely fix, despite the fact that another fix has a higher successful fix count, i.e., Fix 1.

| Scenario 5 | | | | | |
|---|---|---|---|---|---|
| | Fix 1 | Fix 2 | Fix 3 | Fix 4 | Fix 5 |
| P.C. | P0101 | P0101 | P0101 | | |
| S.C.(s) | P0102 | P0102 | P0102 | | |
| | P0103 | P0103 | | | |
| | P0104 | | | | |
| Count: | | 3 | 20 | | |
| Fix Probability: | | 1 | 2 | | |

Scenario 6 presents a situation where one possible fix conforms to each of the DTC's output from the vehicle onboard computer, though the other possible fix has a much higher successful fix count. Again, the most likely fix is identified as that which conforms to each of the DTC's generated by the onboard computer, notwithstanding the lower fix count, i.e., Fix 1.

| Scenario 6 | | | | | |
|---|---|---|---|---|---|
| | Fix 1 | Fix 2 | Fix 3 | Fix 4 | Fix 5 |
| P.C. | P0101 | P0101 | P0101 | | |
| S.C.(s) | P0102 | P0102 | P0102 | | |
| | P0103 | P0103 | P0103 | | |
| | P0104 | P0104 | | | |
| Count: | | 1 | 100 | | |
| Fix Probability: | | 1 | 2 | | |

Scenario 7 presents a situation where both possible fixes include the single DTC generated by the vehicle onboard computer. However, one fix also includes additional DTC's which are not output by the vehicle onboard computer.

Under those circumstances the highest probability fix is identified as that which conforms most closely to the DTC output from the vehicle onboard computer, without additional DTC's, i.e., Fix 2. This is notwithstanding the higher successful diagnosis count of the fix associated with the additional DTC's.

| Scenario 7 | | | | | | |
|---|---|---|---|---|---|---|
| | | Fix 1 | Fix 2 | Fix 3 | Fix 4 | Fix 5 |
| P.C. | P0101 | P0101 | P0101 | | | |
| S.C.(s) | | P0102 | | | | |
| | | P0103 | | | | |
| | | P0104 | | | | |
| Count: | | 1000 | 1 | | | |
| Fix Probability: | | 2 | 1 | | | |

Scenario 8 presents a situation where two possible fixes again present additional DTC's, beyond that output by the vehicle onboard computer. Again, the most likely fix is identified as the fix having the same DTC's as output from the vehicle onboard computer, without any additional DTC's, i.e., Fix 3. Again, this is notwithstanding the higher successful diagnosis count associated with fixes having additional DTC's.

| Scenario 8 | | | | | | |
|---|---|---|---|---|---|---|
| | | Fix 1 | Fix 2 | Fix 3 | Fix 4 | Fix 5 |
| P.C. | P0101 | P0101 | P0101 | P0101 | | |
| S.C.(s) | P0102 | P0102 | P0102 | P0102 | | |
| | | P0103 | P0103 | | | |
| | | P0104 | P0104 | | | |
| Count: | | 1000 | 500 | 2 | | |
| Fix Probability: | | 2 | 3 | 1 | | |

Scenario 9 presents a situation where three possible fixes are identified, each exactly conforming with the DTC output from the vehicle onboard computer, and each having the same successful diagnosis count associated therewith. Under such circumstances the most likely fix is chosen as the fix having the highest associated fix cost, i.e., Fix 1. In such a way, the user is focused on the highest potential fix cost as a basis to evaluate otherwise equally probable fixes.

| Scenario 9 | | | | | | |
|---|---|---|---|---|---|---|
| | | Fix 1 | Fix 2 | Fix 3 | Fix 4 | Fix 5 |
| P.C. | P0101 | P0101 | P0101 | P0101 | | |
| S.C.(s) | | | | | | |
| Count: | | 50 | 50 | 50 | | |
| Fix Cost: | | $500 | $300 | $150 | | |
| Fix Probability: | | 1 | 2 | 3 | | |

Scenario 10 presents a situation where each of the possible fixes includes only a single DTC corresponding to DTC's generated by the vehicle onboard computer, and wherein the successful diagnosis count of each possible fix is the same. Under those circumstances the most likely fix is identified as that having the highest associated cost of the three possible fixes, i.e., Fix 2.

| Scenario 10 | | | | | | |
|---|---|---|---|---|---|---|
| | | Fix 1 | Fix 2 | Fix 3 | Fix 4 | Fix 5 |
| P.C. | P0101 | P0101 | P0101 | P0101 | | |
| S.C.(s) | P0102 | P0105 | P0115 | P0300 | | |
| | P0103 | P0108 | P0108 | P0301 | | |
| | P0104 | P0110 | P0200 | P0302 | | |
| Count: | | 500 | 500 | 500 | | |
| Cost: | | $225 | $300 | $150 | | |
| Fix Probability: | | 2 | 1 | 3 | | |

Scenario 11 presents a situation where each of the three possible fixes again correlate to only one of the DTC's generated by the vehicle onboard computer, and wherein each fix has three additional DTC's that do not find correspondence with the DTC's generated by the vehicle onboard computer. Under those circumstances the most likely fix is identified as the fix having the highest successful fix count of the three possible fixes, i.e., Fix 1.

| Scenario 11 | | | | | | |
|---|---|---|---|---|---|---|
| | | Fix 1 | Fix 2 | Fix 3 | Fix 4 | Fix 5 |
| P.C. | P0101 | P0101 | P0101 | P0101 | | |
| S.C.(s) | P0102 | P0105 | P0115 | P0300 | | |
| | P0103 | P0108 | P0108 | P0301 | | |
| | P0104 | P0110 | P0200 | P0302 | | |
| Count: | | 1000 | 500 | 2 | | |
| Fix Probability: | | 1 | 2 | 3 | | |

As will be apparent to those of ordinary skill in the art, the techniques described above for identifying the most likely fix of the various possible fixes may be modified in accordance with user preference, without departing from the broader aspects of the present invention. For example, ranking of potential fixes by fix cost may be based on prioritizing the lowest fix cost, rather than the highest fix cost, or the presence of additional DTC's may be prioritized differently. Rankings may also be ordered on the basis of other factors, e.g., on the basis of successful fix count, or listed alphabetically.

What is claimed is:

1. A method of processing vehicle diagnostic data received from a vehicle under test to identify a most likely fix associated with the vehicle under test and the vehicle diagnostic data, the method comprising:
    receiving, at a diagnostic database, a single set of data from the vehicle including vehicle identifying information and accompanying vehicle diagnostic data from the vehicle under test;
    using the vehicle identifying information included in the set of data from the vehicle to retrieve, from a prior experience database operatively associated with the diagnostic database, prior experience data associated with vehicles having vehicle identifying information common to the received vehicle identifying information from the vehicle under test, the prior experience data including a plurality of data sets, each data set in the plurality of data sets being associated with a possible vehicle fix;
    prioritizing, on the diagnostic database, the plurality of data sets retrieved from the prior experience database based on an evaluation of the extent to which the data sets in the retrieved prior experience data corresponds to the vehicle diagnostic data included in the single set of data received from the vehicle, wherein the most closely corresponding one of the plurality of data sets in the retrieved prior experience data is identified as the highest priority vehicle experience data and the possible vehicle fix associated therewith is identified as the highest priority fix, the prioritizing occurring independent of consideration of any additional data beyond the single set of data received from the vehicle and the retrieved prior experience data retrieved from the prior experience database; and communicating the highest priority fix to an internet communicable device for display on the internet communicable device.

2. The method of claim 1, wherein the received vehicle diagnostic data includes at least one vehicle diagnostic trouble code.

3. The method of claim 2 wherein the step of prioritizing further includes a consideration of diagnostic trouble codes in the retrieved prior experience data that are not included in the received vehicle diagnostic data.

4. The method of claim 1 wherein the step of prioritizing further includes prioritizing according to one or more prioritization factors including a successful fix count associated with each possible vehicle fix.

5. The method of claim 1 wherein the step of prioritizing further includes prioritizing according to one or more prioritization factors including a cost of repair associated with each possible vehicle fix.

6. The method of claim 1 further comprising the steps of:
   i. accessing an automotive repair procedures database for repairing a range of automotive conditions;
   ii. linking the highest priority fix to an associated repair procedure(s) in the repair procedures database, the associated repair procedure(s) being effective to implement the highest priority fix; and
   iii. accessing the associated repair procedure(s) effective to implement the highest priority fix.

7. The method of claim 6 further comprising the step of communicating information concerning the highest priority fix and the associated repair procedure to the internet communicable device.

8. The method of claim 1 further comprising the steps of:
   communicating the vehicle identifying information and the accompanying vehicle diagnostic data from the vehicle under test to a personal computer; and
   communicating the vehicle identifying information and the accompanying vehicle diagnostic data from the vehicle under test from the personal computer to the diagnostic database.

9. The method of claim 1 further comprising the step of wirelessly communicating the vehicle identifying information and the accompanying vehicle diagnostic data from the internet communicable device to the diagnostic database and wirelessly communicating the highest priority fix from the diagnostic database to the internet communicable device.

10. The method of claim 1 further comprising the steps of:
    communicating the vehicle identifying information and the accompanying vehicle diagnostic data from the vehicle to a cell phone; and
    communicating the vehicle identifying information and the accompanying vehicle diagnostic data from the cell phone to the diagnostic database.

11. The method of claim 1 further comprising the steps of:
    communicating the vehicle identifying information and the accompanying vehicle diagnostic data from the vehicle to a kiosk; and
    communicating the vehicle identifying information and the accompanying vehicle diagnostic data from the kiosk to the diagnostic database.

12. The method of claim 1, wherein the received vehicle diagnostic data includes a primary diagnostic trouble code.

13. The method of claim 12, wherein the received vehicle diagnostic data further includes one or more secondary diagnostic trouble codes.

14. The method of claim 1, further comprising providing access to a repair procedure for implementing the highest priority fix.

15. The method of claim 1, further comprising providing a repair procedure for implementing the highest priority fix.

16. The method of claim 14, wherein the provided access includes a link to data stored on a website.

17. The method of claim 15, wherein the repair procedure is provided via a transmission from the diagnostic database.

18. The method of claim 1, wherein the receiving step, the retrieving step, and the prioritizing step each proceed independent of human intervention.

19. The method of claim 1, wherein the received vehicle diagnostic data further includes vehicle parameter identification (PID) data.

20. The method of claim 1 wherein the vehicle identifying information includes a vehicle year, make, and model information.

21. The method of claim 1 wherein the diagnostic database is disposed remotely from the vehicle under test.

22. The method of claim 1, wherein the step of prioritizing includes prioritizing the possible vehicle fixes according to one or more prioritization factors including a successful fix count associated with each of the possible vehicle fixes.

23. The method of claim 1, wherein the identification of the highest priority fix proceeds without consideration of any information or data from the vehicle other than the received vehicle identifying information and the accompanying vehicle diagnostic data.

24. The method of claim 1, further comprising the step of displaying the highest priority fix on the internet communicable device.

25. The method of claim 1 wherein the diagnostic data received at the diagnostic database is a single diagnostic trouble code or a single set of diagnostic trouble codes.

26. The method of claim 1, wherein the diagnostic data received at the diagnostic database is received from a diagnostic port on the vehicle.

27. The method of claim 1, wherein the diagnostic data is received at the diagnostic database in response to connection of a diagnostic device to a diagnostic port on the vehicle.

28. The method of claim 1, further comprising the steps of receiving the single set of data at a handheld electronic device and uploading the single set of data from the handheld electronic device to the diagnostic database autonomously in response to receipt of the single set of data at the handheld electronic device.

29. The method of claim 1, wherein the single set of data received at the diagnostic database is devoid of a possible vehicle fix derived from the vehicle diagnostic data.

30. The method of claim 1, further comprising the steps of receiving the single set of data at a handheld electronic device and uploading the single set of data from the handheld electronic device to the diagnostic database in real time.

31. A method of processing vehicle diagnostic data received from a vehicle under test to identify a most likely fix associated with the vehicle under test and the vehicle diagnostic data, the method comprising:

receiving, at a diagnostic database, a single set of data from the vehicle including vehicle identifying information and accompanying vehicle diagnostic data from the vehicle under test using the vehicle identifying information included in the set of data from the vehicle to retrieve, from a prior experience database operatively associated with the diagnostic database, prior experience data associated with vehicles having vehicle identifying information common to the received vehicle identifying information from the vehicle under test, the prior experience data including a plurality of data sets, each data set in the plurality of data sets being associated with a possible vehicle fix;

prioritizing, on the diagnostic database, the plurality of data sets retrieved from the prior experience database based on an evaluation of the extent to which each of the plurality of data sets in the retrieved prior experience data corresponds to the vehicle diagnostic data included in the single set of data received from the vehicle, wherein the most closely corresponding one of the plurality of data sets in the retrieved prior experience data is identified as the highest priority vehicle experience data and the possible vehicle fix associated therewith is identified as the highest priority fix; and communicating the highest priority fix to an internet communicable device for display on the internet communicable device;

wherein the retrieving, prioritizing, and communicating steps proceed autonomously in response to receiving the single set of data at the diagnostic database.

32. The method recited in claim 31, further comprising the step of:

receiving the single set of data at a handheld electronic device; and uploading the single set of data from the handheld electronic device to the diagnostic database autonomously in response to receipt of the single set of data at the handheld electronic device.

* * * * *